US011315391B2

(12) United States Patent
Park et al.

(10) Patent No.: US 11,315,391 B2
(45) Date of Patent: Apr. 26, 2022

(54) AUTOMATIC TELLER MACHINE HAVING A NOTE STORAGE UNIT WITH A DOOR CAPABLE OF BEING LOCKED AND UNLOCKED

(71) Applicant: HYOSUNG TNS INC., Seoul (KR)

(72) Inventors: Jong Seong Park, Gyeonggi-Do (KR);
Chang Ho Park, Gyeonggi-Do (KR);
Jun Young Kim, Gyeonggi-Do (KR);
Soon Ho Choi, Gyeonggi-Do (KR)

(73) Assignee: HYOSUNG TNS INC., Seoul (KR)

( * ) Notice: Subject to any disclaimer, the term of this patent is extended or adjusted under 35 U.S.C. 154(b) by 40 days.

(21) Appl. No.: 16/957,206

(22) PCT Filed: Dec. 20, 2018

(86) PCT No.: PCT/KR2018/016372
§ 371 (c)(1),
(2) Date: Jun. 23, 2020

(87) PCT Pub. No.: WO2019/132424
PCT Pub. Date: Jul. 4, 2019

(65) Prior Publication Data
US 2020/0320833 A1  Oct. 8, 2020

(30) Foreign Application Priority Data

Dec. 26, 2017 (KR) .......................... 10-2017-0179032
Dec. 26, 2017 (KR) .......................... 10-2017-0179033

(51) Int. Cl.
*G07F 19/00* (2006.01)
*G06Q 20/10* (2012.01)

(52) U.S. Cl.
CPC ....... *G07F 19/202* (2013.01); *G06Q 20/1085* (2013.01); *G07F 19/203* (2013.01); *G07F 19/205* (2013.01)

(58) Field of Classification Search
USPC .............................................. 235/379; 705/43
See application file for complete search history.

(56) References Cited

U.S. PATENT DOCUMENTS

2007/0108267 A1    5/2007  Jonsson et al.

FOREIGN PATENT DOCUMENTS

| CN | 101974997 A | | 2/2011 |
|---|---|---|---|
| JP | 07044755 A | * | 2/1995 |
| KR | 10-2011_0012909 A | | 2/2011 |
| KR | 10_1016460 B1 | | 2/2011 |
| KR | 10-2011_0092646 A | | 8/2011 |
| KR | 10-1770074 B1 | | 8/2017 |
| RU | 67751 U1 | | 10/2007 |

* cited by examiner

*Primary Examiner* — Suezu Ellis
(74) *Attorney, Agent, or Firm* — Bacon & Thomas, PLLC

(57) ABSTRACT

An automatic teller machine includes a door having a locking part for opening and closing a medium storage space in which a medium is stored; a first slide member located at a locked position or an opened position by means of a locking or opening operation of the locking part; a second slide member for locking the door by means of engagement with the first slide member when the first slide member is in the locked position; a drive unit for moving the second slide member between a first position in which the door is locked and a second position in which the door is unlocked when the first slide member is in the locked position; and a control unit for controlling driving of the drive unit.

13 Claims, 12 Drawing Sheets

[FIG. 1]
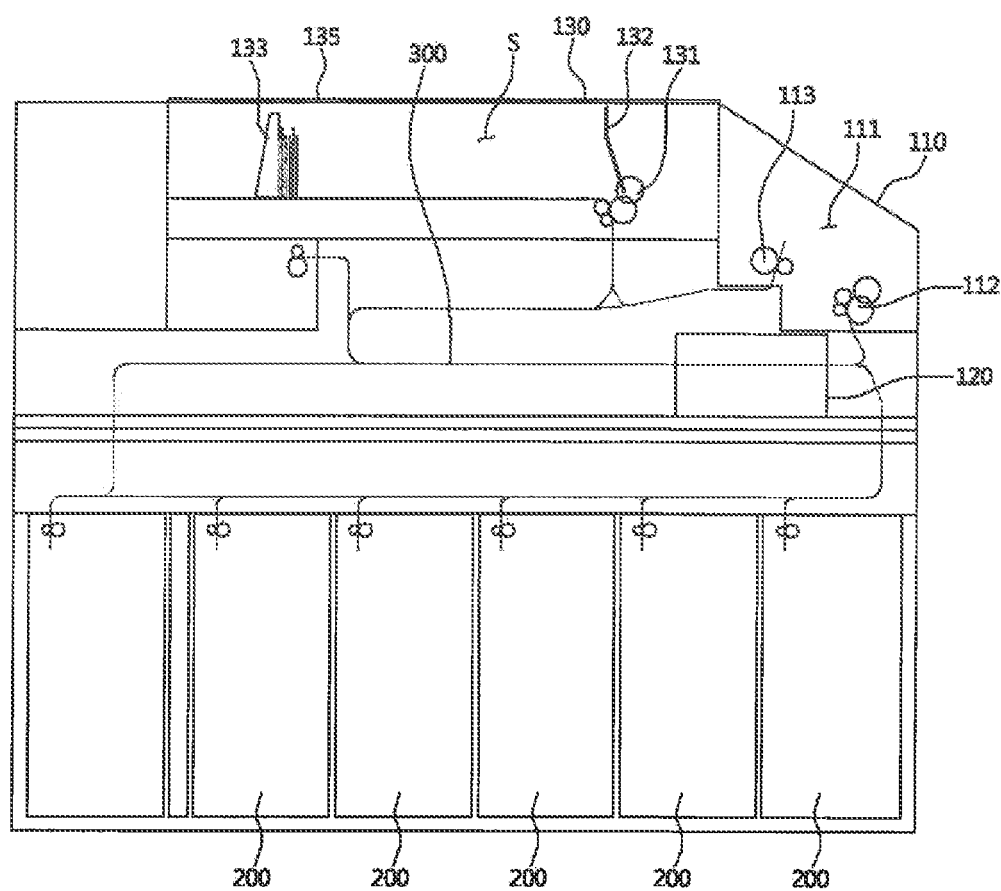

[FIG. 2]
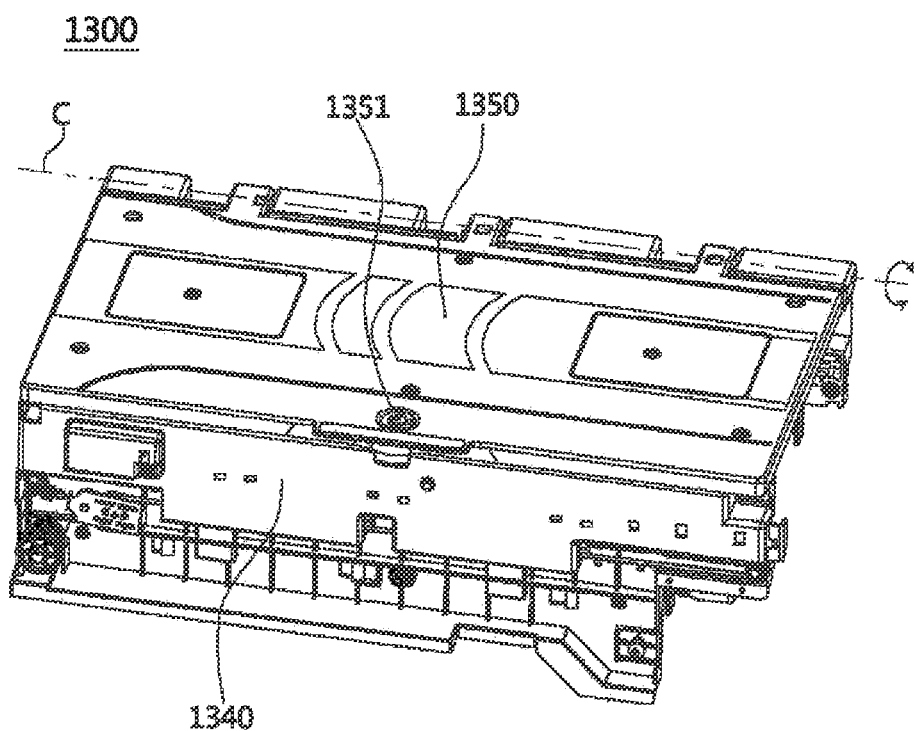

[FIG. 3]
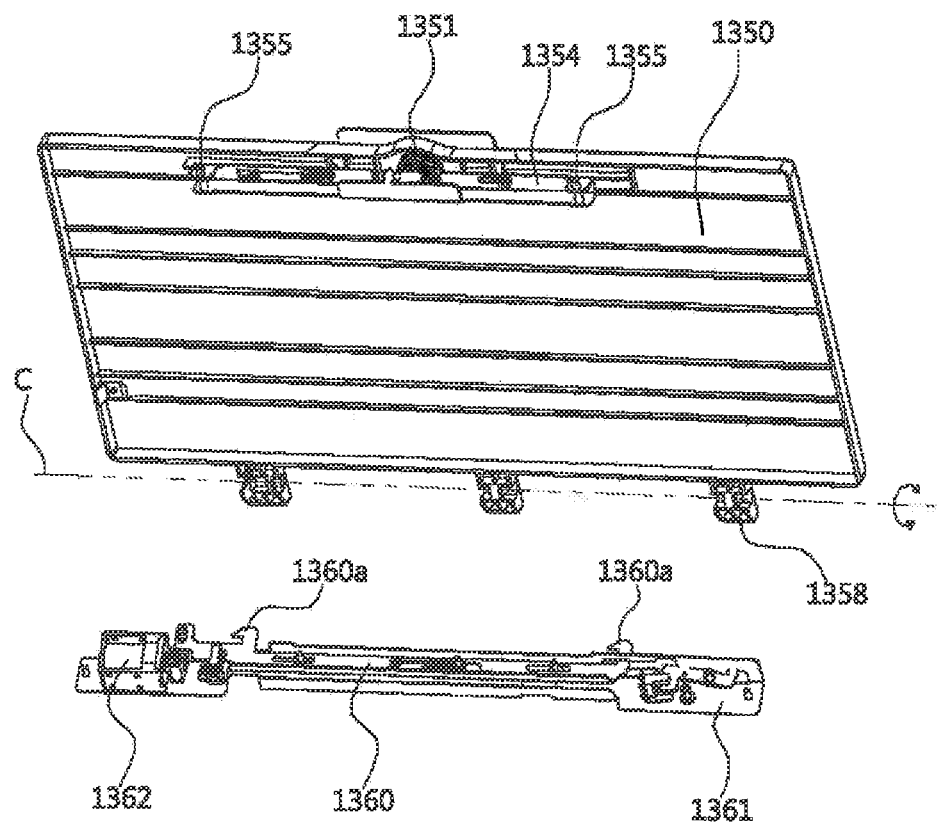
[FIG. 4]
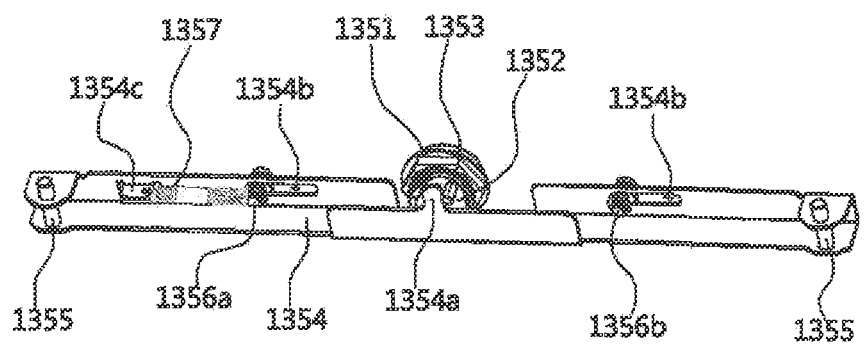

[FIG. 5]
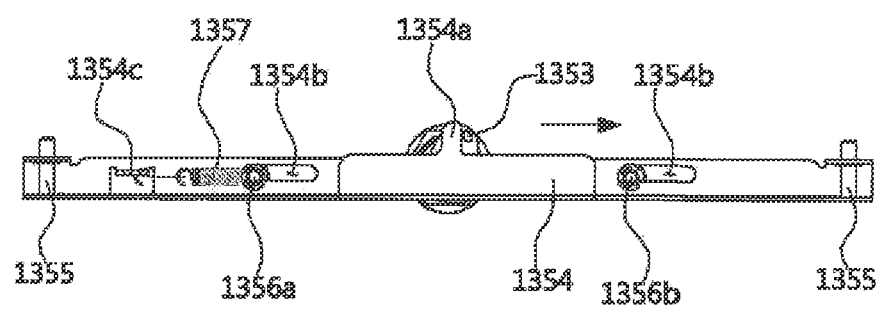
(a)
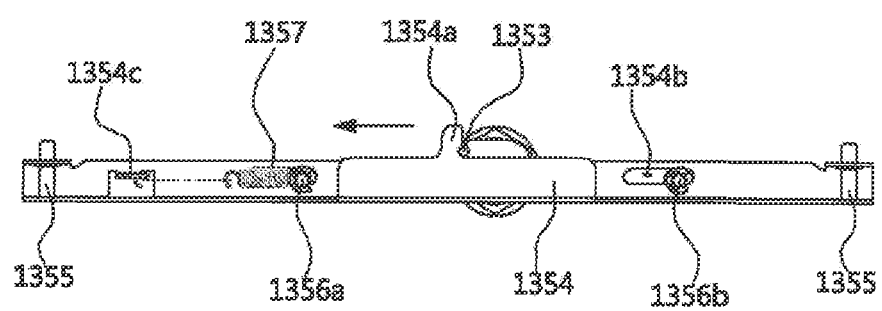
(b)

[FIG. 6]
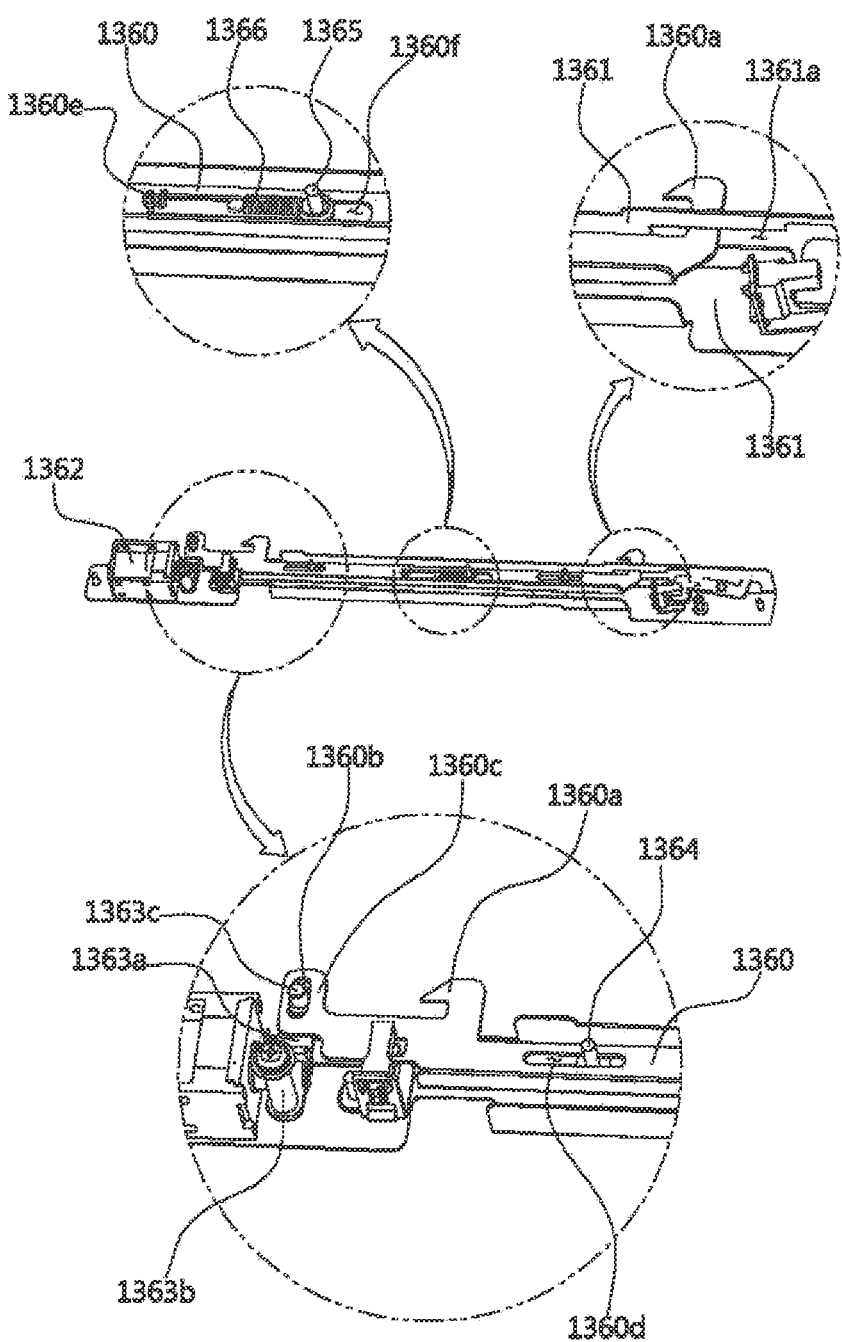

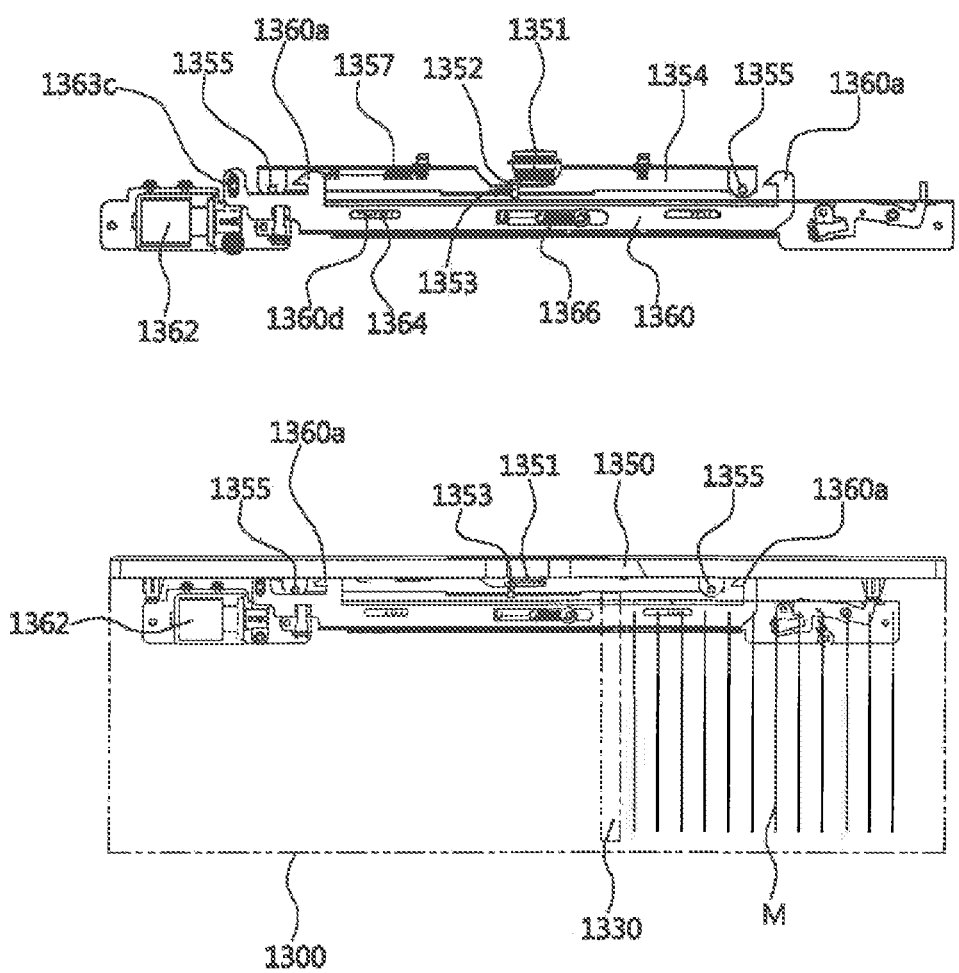
[FIG. 7]

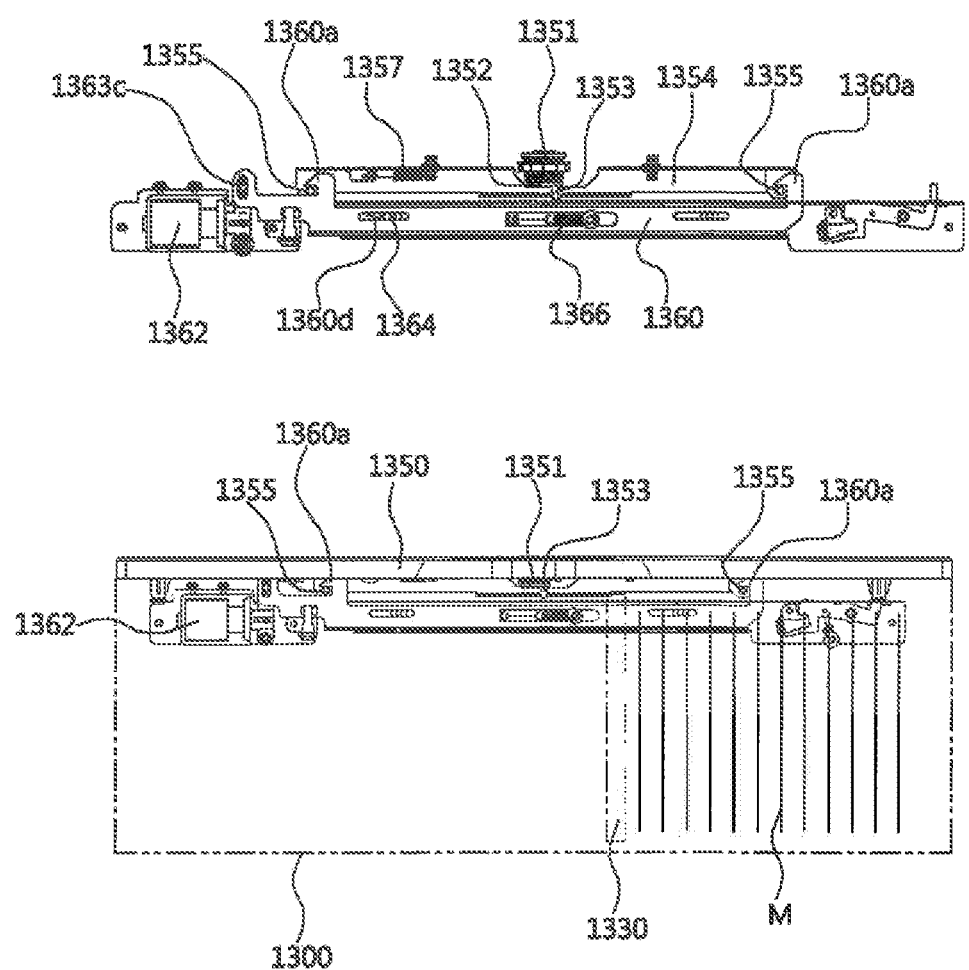
[FIG. 8]

[FIG. 9]
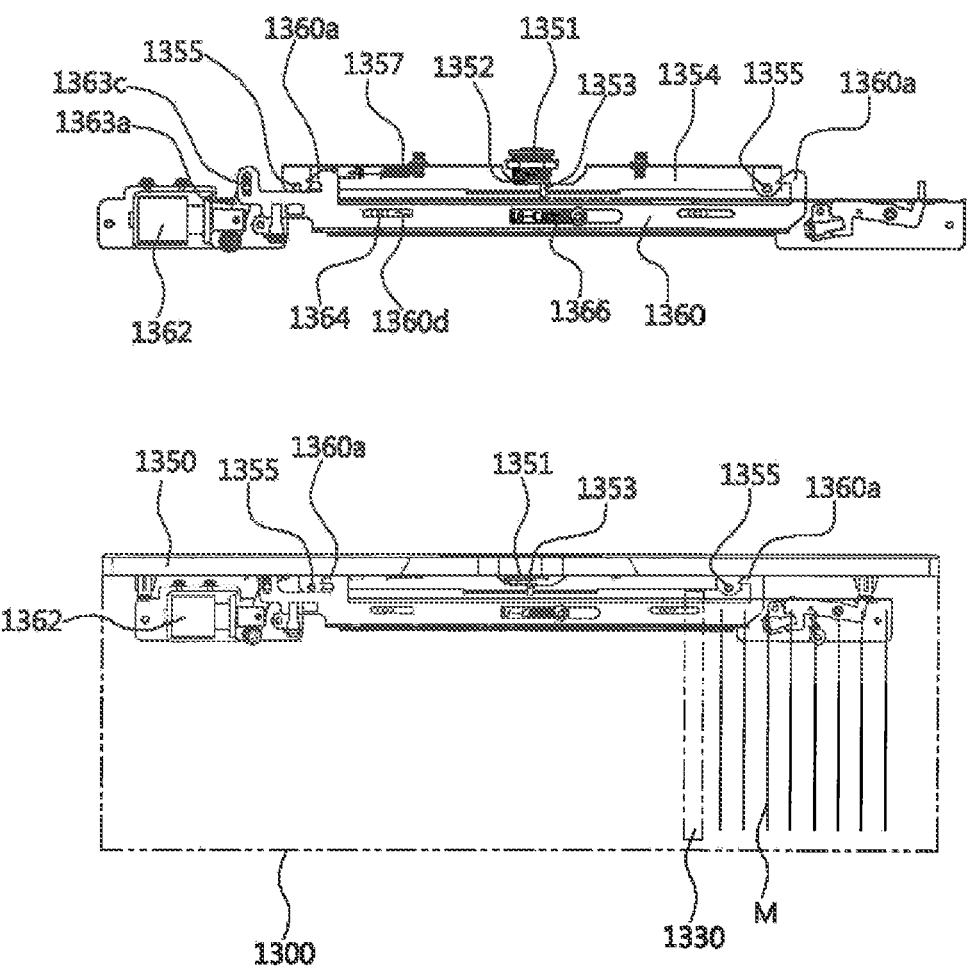

[FIG. 10]
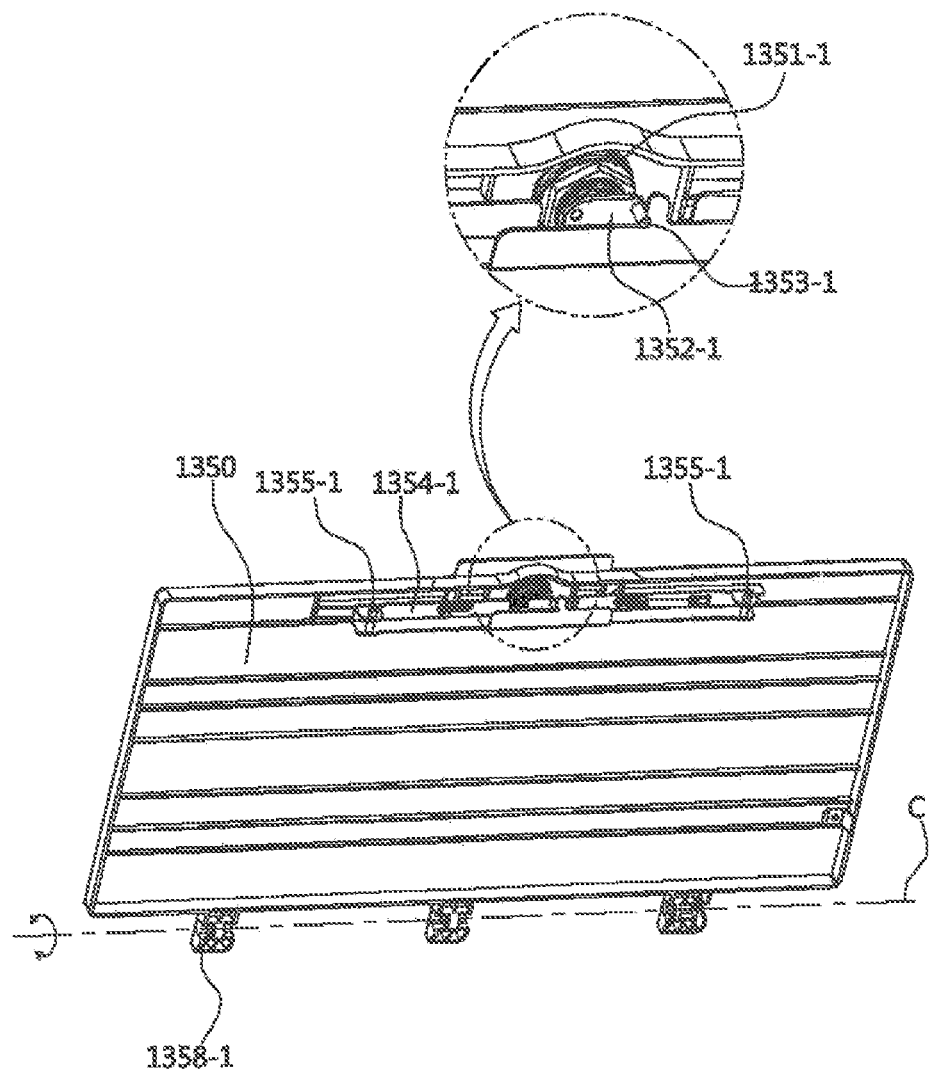

[FIG. 11]
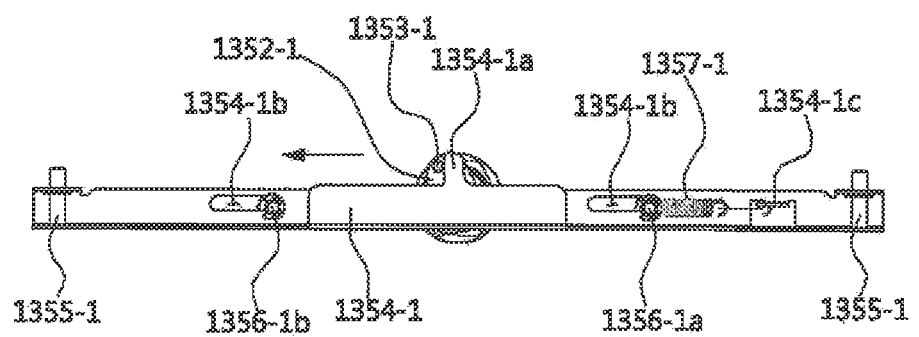
(a)
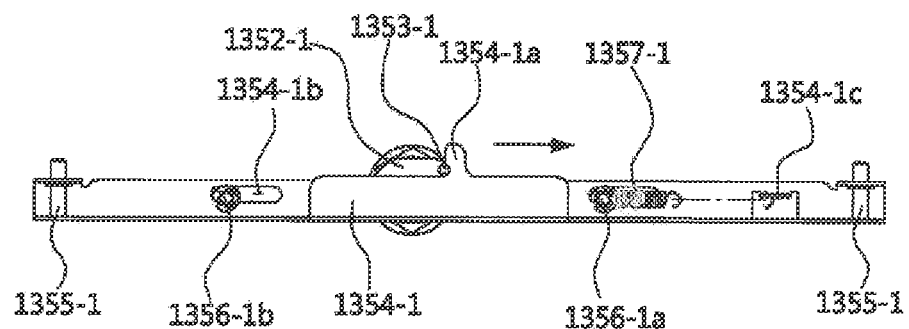
(b)

[FIG. 12]
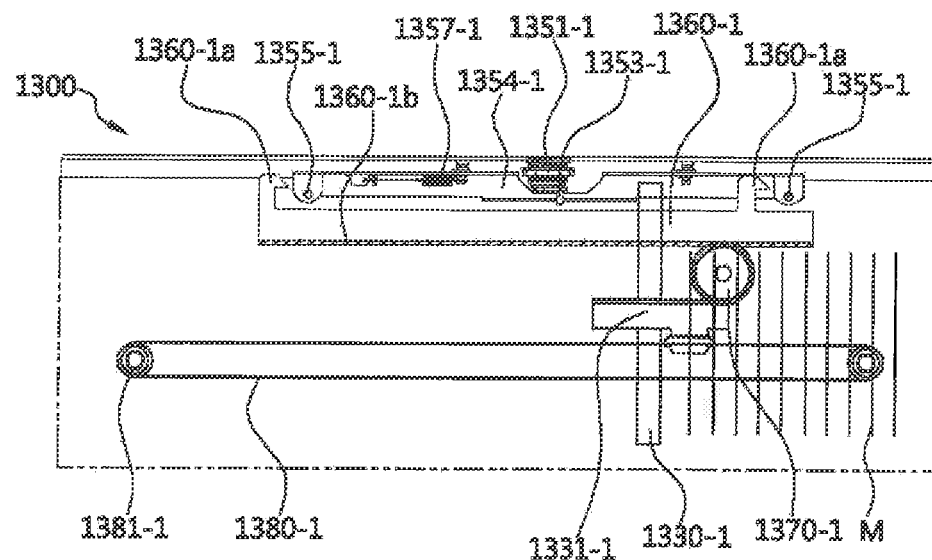
[FIG. 13]
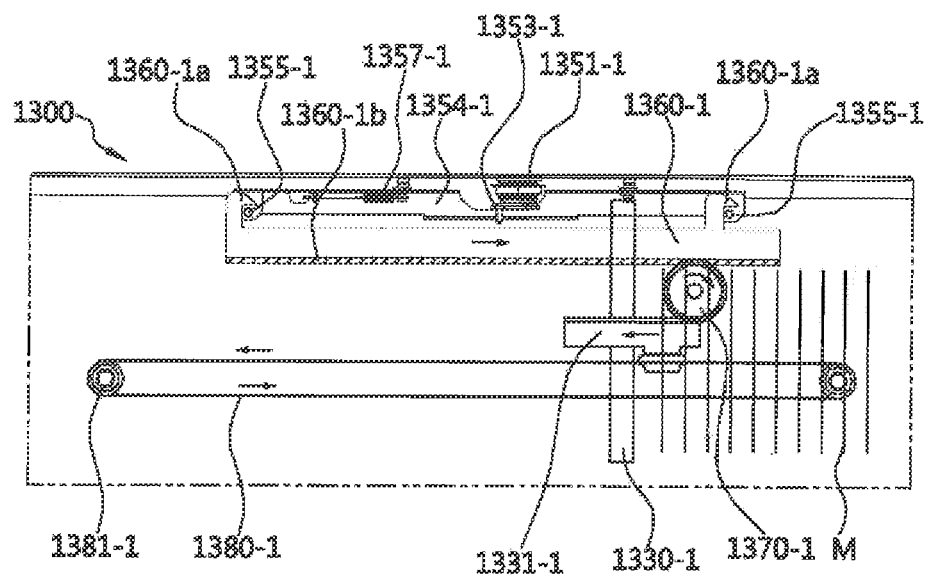

[FIG. 14]
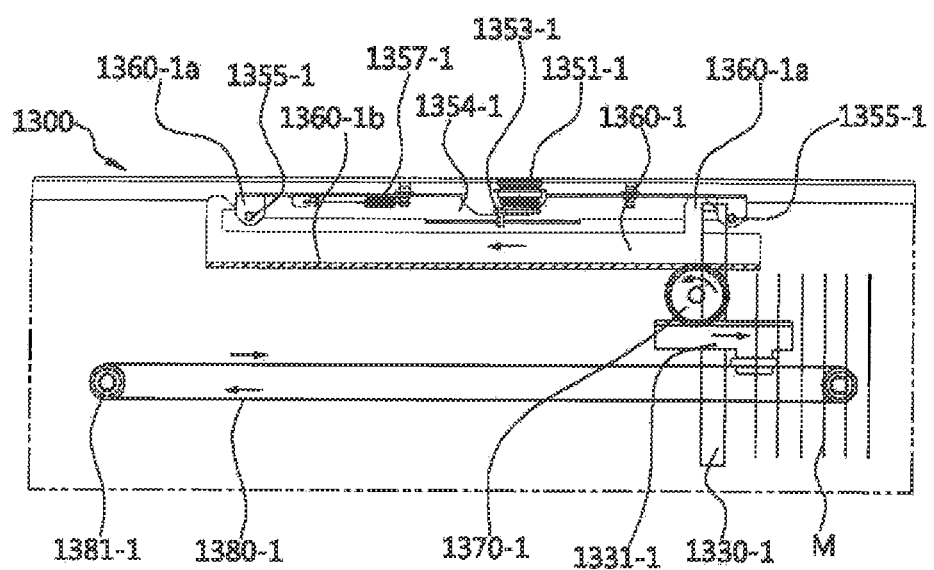

AUTOMATIC TELLER MACHINE HAVING A NOTE STORAGE UNIT WITH A DOOR CAPABLE OF BEING LOCKED AND UNLOCKED

TECHNICAL FIELD

The present invention relates to an automated teller machine (ATM) including a note storage unit and a method of controlling the same, and more particularly, to an ATM including a note storage unit for improving both security and convenience by allowing a door provided in the note storage unit to be locked or opened and a method of controlling the ATM.

BACKGROUND ART

Generally, an automated teller machine (ATM) has a note handling apparatus for processing a deposit or withdrawal of notes such as bills or checks.

The note processing apparatus includes a deposit and withdrawal unit having a note dispenser and a note receiver which include a plurality of rollers so that a customer may insert or take out notes for a deposit or withdrawal, a distinguishing unit for distinguishing whether the notes deposited or withdrawn through the deposit and withdrawal unit are abnormal, a temporary storage unit for temporarily storing notes distinguished by the distinguishing unit as normal notes among notes deposited through the deposit and withdrawal unit, a note storage unit including a plurality of cassettes to store deposited notes and dispense notes contained therein when a withdrawal is requested, and a conveyance path for connecting the deposit and withdrawal unit, the distinguishing unit, the temporary storage unit, and the note storage unit to each other and conveying notes.

The temporary storage unit and the note storage unit have a door for opening or closing the internal space in which notes are stored. A bundle of keys are provided for the door so that the door may be opened or closed with the key. The door is opened or closed by a locking operation or opening operation with the key.

In the temporary storage unit and the note storage unit, about 3000 notes may be stored. For security purposes, only an authorized person having the key can open the door. Consequently, when a worker who does not have the key maintains the ATM, he or she cannot open the door, which is inconvenient in maintenance.

Korean Patent Application Publication No. 10-2017-0043190 discloses a related art of the above-described ATM.

DISCLOSURE

Technical Problem

The present invention has been devised to solve the above-described problems and is directed to providing an automated teller machine (ATM) including a note storage unit of which a door is openable even after a locking operation is performed with a key so that the convenience of a maintenance worker may be improved, and a method of controlling the ATM.

The present invention is also directed to providing an ATM including a note storage unit of which a door is kept locked when the number of notes stored in a note storage unit reaches a set number so that the security may be improved, and a method of controlling the ATM.

Technical Solution

One aspect of the present invention provides an automated teller machine (ATM) having a note storage unit including: a door including a lock unit for opening or closing a note storage space in which notes are stored, a first slide member placed at a locked position or an opened position by a locking or opening operation of the lock unit a second slide member configured to lock the door by being caught by the first slide member when the first slide member is at the locked position, a drive unit configured to move the second slide member between a first position for locking the door and a second position for unlocking the door when the first slide member is at the locked position, and a control unit configured to control running of the drive unit.

When the number of notes stored in the note storage space is a set number or more, the second slide member may be placed at the first position to lock the door, and when the number of notes is smaller than the set number, the second slide member may be placed at the second position to unlock the door.

The automated teller machine may further include a note position sensing member of which a position varies with a change in the number of notes stored in the note storage space and a position sensor configured to sense the note position sensing member when the number of notes becomes the set number.

A catch pin may be coupled to at least one end of the first slide member, and a catch portion may be formed in the second slide member in a hook shape to be caught by the catch pin when the door is locked.

The automated teller machine may further include a drive link configured to be rotated about a rotation axis on one side by the drive unit and a drive pin integrally formed with an end of the drive link, a slot having a length in a direction perpendicular to a movement direction of the second slide member may be formed in the second slide member, and the drive pin may be inserted in the slot and absorb a displacement caused when the second slide member is moved by the running of the drive unit.

At least one slot having a length in a direction of the movement of the second slide member may be formed in the second slide member, and at least one guide pin fixed to an external frame provided on an external side of the second slide member may be inserted in the slot to guide reciprocal movement of the second slide member.

In the second slide member, a slot having a length in a direction of the movement of the second slide member may be formed, a guide pin fixed to an external frame provided on an external side of the second slide member may be provided, and a spring which extends as the second slide member moves toward the first position and is restored as the second slide member moves toward the second position may be provided, and one end of the spring may be fixed to the guide pin, and the other and may be fixed to a spring-fixed end formed at a position which is closer to the drive unit than the guide pin.

The automated teller machine may further include an external frame provided on an external side of the second slide member and a support member coupled to the external frame and in which a cut-off portion is formed by cutting out a portion of the support member, and the catch portion may be inserted through the cut-off portion.

The automated teller machine may further include a power transfer member configured to change a position of the second slide member with a change in the number of notes, move the second slide member between the first position for locking the door and the second position for unlocking the door when the first slide member is at the locked position, and interoperate with a position of a push plate which supports a last one of the notes stored in the note storage space.

The power transfer member may include a first power transfer member engaged with the second slide member to rotate at a fixed position and a second power transfer member coupled to the push plate to move with the push plate and engaged with the first power transfer member.

When the number of notes is smaller than a set number and the second slide member is placed at the second position, gear teeth engagement between the first power transfer member and the second power transfer member may be maintained.

When the number of notes exceeds a set number, gear teeth engagement between the first power transfer member and the second power transfer member may be released.

Even when the gear teeth engagement between the first power transfer member and the second power transfer member is released, catching of the first slide member and the second slide member may be maintained by elastic force of a spring connected to the second slide member.

Another aspect of the present invention provides a method of controlling an ATM, the method including: a) determining whether the number of notes stored in a note storage unit corresponds to a set number which is set in a control unit and b) after a locking operation is performed by a lock unit of a door for opening or closing the note storage unit, controlling the door to be locked to a counterpart and prevented from being opened when the number of notes reaches the set number and controlling the door to be released from the counterpart and openable when the number of notes is smaller than the set number.

The control of operation a) and operation b) may be performed in a tallying mode for tallying notes remaining in a reflux cassette when notes stored in the reflux cassette are temporarily stored in the note storage unit.

Operation a) and operation b) may be performed when a signal for tallying the number of notes stored in a reflux cassette is input, the notes are each individually separated from the reflux cassette and transferred to a distinguishing unit, the distinguishing unit distinguishes the notes to store the number of notes in the control unit, and notes passed through the distinguishing unit are temporarily stored in the note storage unit.

Operation b) may include, when the number of notes reaches the set number and the door is locked to the counterpart and prevented from being opened, storing all the notes of the reflux cassette in the note storage unit, and when the notes of the note storage unit are separated again and stored in the reflux cassette, the number of notes becomes the set number or less so that the door becomes openable.

Advantageous Effects

According to the present invention, even after a locking operation is performed with a key on a door of a note storage unit, the door is allowed to be opened. Consequently, it is possible to improve the convenience of a maintenance worker.

When the number of notes stored in a note storage unit reaches a set number, the door is kept locked. Consequently, the security is improved, and it is possible to prevent a case of robbery.

When a fault occurs during an operation of automatically tallying notes using a temporary storage unit, a worker can open the door of the note storage unit. Consequently, it is possible to rapidly correct the fault.

When the number of notes reaches a set number, it is possible to unlock the door by an instrumental combination of a first power transfer member and a second power transfer member without a separate component for control. Consequently, an apparatus configuration is simplified.

DESCRIPTION OF DRAWINGS

FIG. 1 is a diagram showing an internal configuration of an automated teller machine (ATM) of the present invention.

FIG. 2 is a perspective view of a note storage unit of the present invention.

FIG. 3 is a perspective view of a door and first and second slide members in a note storage unit according to a first exemplary embodiment of the present invention.

FIG. 4 is a perspective view of a lock unit and the first slide member in the note storage unit according to the first exemplary embodiment of the present invention.

FIG. 5 separately shows the first slide member at a locked position and an opened position in the note storage unit according to the first exemplary embodiment of the present invention.

FIG. 6 shows a perspective view and enlarged views of a second slide member and a drive unit in the note storage unit according to the first exemplary embodiment of the present invention.

FIG. 7 shows a case in which the first slide member is at the opened position and the second slide member is at a first position in the note storage unit according to the first exemplary embodiment of the present invention.

FIG. 8 shows a case in which the first slide member is at the locked position and the second slide member is at the first position in the note storage unit according to the first exemplary embodiment of the present invention.

FIG. 9 shows a case in which the first slide member is at the locked position and the second slide member is at a second position in the note storage unit according to the first exemplary embodiment of the present invention.

FIG. 10 is a perspective view of the door and the first slide member in the note storage unit according to the first exemplary embodiment of the present invention.

FIG. 11 separately shows the first slide member at the locked position and the opened position in the note storage unit according to the first exemplary embodiment of the present invention.

FIG. 12 shows a case in which the first slide member is at the opened position and the second slide member is at the first position in the note storage unit according to the first exemplary embodiment of the present invention.

FIG. 13 shows a case in which the first slide member is at the locked position and the second slide member is at the first position in the note storage unit according to the first exemplary embodiment of the present invention.

FIG. 14 shows a case in which the first slide member is at the locked position and the second slide member is at the second position in the note storage unit according to the first exemplary embodiment of the present invention.

REFERENCE SIGNS LIST

110: deposit/withdrawal unit
120: distinguishing unit
130: temporary storage unit
200: reflux cassette
300: conveyance path 1300: note storage unit
130, 1330: push plate
1340: external frame
1350: door
1351, 1351-1: lock unit
1352, 1352-1: locking rotary disk
1353, 1353-1: rotary protrusion
1354, 1354-1: first slide member
1355, 1355-1: catch pin
1356a, 1356b: guide pin
1357, 1357-1: first spring
1358, 1358-1: hinge unit
1360, 1360-1: second slide member
1360a, 1360-1a: catch portion
1360b, 1360b-1b: slot
1360c: link-catching portion
1361: support member
1362: drive unit
1363a: drive link
1363b: rotation axis
1363c: drive pin
1364, 1365: guide pin
1366: second spring
1370-1: first power transfer member
1380-1: belt
1381-1: pulley

MODES OF THE INVENTION

Hereinafter, an automated teller machine (ATM) of the present invention will be described in detail with reference to the accompanying drawings.

Referring to FIG. 1, the ATM of the present invention includes a note storage unit including a deposit/withdrawal unit 110 in which a separator 112 for separating each individual note in an internal space 111 and an accumulator 113 for loading notes into the internal space 111 are respectively provided at a front portion and a rear portion thereof a distinguishing unit 120 for distinguishing whether the notes are abnormal and types of the notes, a plurality of reflux cassettes 200 for storing deposited notes or notes to be withdrawn and a temporary storage unit 130 for temporarily storing notes which are distinguished as normal notes by the distinguishing unit 120 when a deposit is made, and a conveyance path 300 for connecting the deposit/withdrawal unit 110, the distinguishing unit 120, the temporary storage unit 130, and the reflux cassettes 200 to each other and conveying the notes. The notes include checks and bills.

The deposit/withdrawal unit 110 is a space into which notes are loaded for a deposit or in which notes are accumulated for a withdrawal. The deposit/withdrawal unit 110 is provided with the separator 112 for separating each individual note inserted into the internal space 111 onto the conveyance path 300, and the accumulator 113 for accumulating notes conveyed through the conveyance path 300 in the internal space 111.

Each of the separator 112 and the accumulator 113 includes a plurality of opposing rollers and separates or accumulates notes by rotation of the rollers. The separator 112 includes a pickup roller to separate each individual note.

The distinguishing unit 120 distinguishes whether notes conveyed along the conveyance path 300 are abnormal and types of the notes.

The temporary storage unit 130 temporarily stores the notes distinguished by the distinguishing unit 120 to calculate the amount of a deposit and discharges the temporarily stored notes to the conveyance path 300 to receive the deposit.

A separator/accumulator 131 is provided on an entrance side of the temporary storage unit 130 so that the notes may be accumulated and separated. The separator/accumulator 131 includes a pickup roller having a circumferential surface on which a rubber member is provided to separate each individual note accumulated in an internal space S, a feed roller for applying conveyance power to the each individual note separated by the pickup roller, and a guide roller installed opposite to the feed roller and preventing notes from being separated in pairs.

The temporary storage unit 130 includes a front plate 132 and a push plate 133 so that notes may be stood upright and arranged in a horizontal stack in the internal space S. The temporary storage unit 130 has a rectangular shape of which a cross-section is long in a front-to-back direction as shown in FIG. 1.

The front plate 132 is provided above the separator/accumulator 131 to guide accumulation of notes when the notes are accumulated in the internal space S, and the push plate 133 is provided behind the front plate 132 so that notes may be accumulated standing upright between the push plate 133 and the front plate 132.

The push plate 133 is movable forward or backward according to the number of notes accumulated in the internal space S.

The forward direction indicates a rightward direction in which the front plate 132 is provided in FIG. 1, and the backward direction indicates the opposite direction, that is, a leftward direction in which the push plate 133 is provided.

A door 135 for opening or closing the internal space S is provided on the upper side of the temporary storage unit 130. When the door 135 is opened, a user may accumulate notes in the internal space S or take out notes accumulated in the internal space S.

The door 135 is rotated upward or downward about a rotation axis on one side to be opened or closed. The door 135 is opened or closed with a key.

Referring to FIG. 2, a note storage unit of the present invention will be described. A note storage unit 1300 of FIG. 2 illustrates a case in which characteristics of the present invention am applied to the temporary storage unit 130 of FIG. 1, but characteristics of the present invention can be applied to other note storage units such as the reflux cassettes 200.

Notes are stored in a note storage space in the note storage unit 1300. The note storage unit 1300 has a door 1350 for opening or closing the internal space, and an external frame 1340 is provided on one side of the door 1350 to surround at least one side surface of the note storage unit 1300.

A lock unit 1351 is provided to open or close the door 1350. The lock unit 1351 may be opened or closed with the key. When an opening operation is performed in the lock unit 1351, the door 1350 is rotated clockwise about a rotation axis C on one side and thus is opened. While the door 1350 is opened, the door 1350 is rotated in the opposite direction and then is closed by a locking operation of the lock unit 1351.

A configuration for opening or closing the door 1350 in the note storage unit 1300 according to a first exemplary embodiment of the present invention will be described with reference to FIGS. 3 and 4.

The lock unit 1351 includes a locking rotary disk 1352 which is rotated by a locking operation or opening operation with the key and a rotary protrusion 1353 which protrudes from one side surface of the locking rotary disk 1352 at a position outwardly deviating from the center of the locking rotary disk 1352.

When the key is operated, the locking rotary disk 1352 and the rotary protrusion 1353 are rotated together.

The note storage unit 1300 includes a first slide member 1354 which is placed at a locked position by the locking operation of the lock unit 1351 or placed at an opened position by the opening operation.

The locked position denotes that the first slide member 1354 is moved rightward along a left-right direction parallel to the rotation axis C in FIG. 3. The opened position denotes that first slide member 1354 is moved leftward along the left-right direction parallel to the rotation axis C in FIG. 3.

The first slide member 1354 is formed to be elongated in the left-right direction, which is a movement direction between the locked position and the opened position. One pair of catch pins 1355 are provided at the both ends of the first slide member 1354.

At the center of the first slide member 1354, a catching protrusion portion 1354a is formed and comes into contact with the rotary protrusion 1353 of the lock unit 1351.

One pair of slots 1354b are formed on two side portions of the first slide member 1354, and one pair of guide pins 1356a and 1356b are inserted in the pair of slots 1354b. While the first slide member 1354 moves, the first slide member 1354 is guided by the guide pins 1356a and 1356b in the slots 1354b. The guide pins 1356a and 1356b are fixed to the external frame 1340.

A first spring 1357 is connected to the first slide member 1354. One end of the first spring 1357 is connected to a spring-fixed end 1354c integrally formed with the first slide member 1354, and the other end of the first spring 1357 is connected to the guide pin 1356a.

Since the guide pin 1356a is fixed to the external frame 1340, the first spring 1357 extends when the first slide member 1354 is at the opened position and is restored due to elastic restoring force when the first slide member 1354 is at the locked position.

FIG. 5A shows a locked state, and FIG. 5B shows an opened state. The locking operation and opening operation of the lock unit 1351 and the first slide member 1354 in the note storage unit 1300 according to the first exemplary embodiment of the present invention will be described with reference to FIG. 5.

When the key is rotated for the opening operation in the state of FIG. 5A, the rotary protrusion 1353 is rotated counterclockwise as shown in FIG. 5B, and the rotary protrusion 1353 pushes the catching protrusion portion 1354a so that the first slide member 1354 is moved leftward by overcoming the elastic force of the first spring 1357 while being guided by the guide pin 1356a in the slot 1354b. In this case, the rotary protrusion 1353 is kept in contact with the catching protrusion portion 1354a.

When the key is rotated for the locking operation in the state of FIG. 5B, the rotary protrusion 1353 is rotated clockwise as shown in FIG. 5A, and the first slide member 1354 is moved rightward by the elastic restoring force of the first spring 1357 while being guided by the guide pin 1356a in the slot 1354b. In this case, the rotary protrusion 1353 is kept in contact with the catching protrusion portion 1354a.

The configuration of a second slide member 1360 in the note storage unit 1300 according to the first exemplary embodiment of the present invention will be described with reference to FIG. 6.

When the first slide member 1354 is at the locked position, the second slide member 1360 is placed at a first position in which the second slide member 1360 is caught by the first slide member 1354 so that the door 1350 is locked. Alternatively, when the first slide member 1354 is at the locked position, the second slide member 1360 is placed at a second position in which the door 1350 is unlocked.

To this end, the second slide member 1360 includes a drive unit 1362 for reciprocally moving the second slide member 1360 between the first position and the second position and a control unit for controlling running of the drive unit 1362.

In the second slide member 1360, one pair of catch portions 1360a are formed in a hook shape at both sides so that the second slide member 1360 may be caught by the catch pins 1355 when the door 1350 is locked.

At least one slot 1360d is formed in the second slide member 1360, and a guide pin 1364 is inserted in the slot 1360d. When the second slide member 1360 is moved between the first position and the second position, the second slide member 1360 is moved while being guided by the guide pin 1364 in the slot 1360d. The guide pin 1364 is fixed to the external frame 1340.

A second spring 1366 is connected to the second slide member 1360. One end of the second spring 1366 is connected to a spring-fixed end 1360e integrally formed with the second slide member 1360, and the other end of the second spring 1366 is connected to the guide pin 1365. The spring-fixed end 1360e is formed at a position which is closer to die drive unit 1362 than the guide pin 1365.

Since the guide pin 1365 is fixed to the external frame 1340, the second spring 1366 extends when the second slide member 1360 is at the first position and is restored due to elastic restoring force when the second slide member 13560 is at the second locked position.

A slot 1360f having a length in a movement direction of the second slide member 1360 is formed in the second slide member 1360, and the guide pin 1365 is inserted in the slot 1360f and guides the second slide member 1360 on the move.

A drive link 1363a, a rotation axis 1363b, and a drive pin 1363c are provided to transfer driving force of the drive unit 1362 to the second slide member 1360.

The drive unit 1362 may be a solenoid valve. An end of the drive unit 1362 is connected to an approximately middle position of the drive link 1363a, and one end and the other end of the drive link 1363a are connected to the rotation axis 1363b and the drive pin 1363c, respectively.

When the solenoid valve is operated, the drive link 1363a is moved between the first position and the second position while being rotated about the rotation axis 1363b, and the drive pin 1363c is also moved between the first position and the second position while being rotated about the rotation axis 1363b.

The drive pin 1363c is inserted in a slot 1360b formed in a link-catching portion 1360c of the second slide member 1360, and the slot 1360b is formed to have a length in a direction perpendicular to a reciprocal movement direction of the second slide member 1360 so that a displacement is absorbed according to rotary motion of the drive pin 1363c.

Meanwhile, a cut-off portion 1361a is formed by cutting out a portion of the support member 1361 in a support member 1361 coupled to the external frame 1340, and a catch portion 1360a is inserted through the cut-off portion 1361a and moved.

Operation of the lock unit 1351, the first slide member 1354, and the second slide member 1360 in the note storage unit 1300 according to the first exemplary embodiment will be described with reference to FIGS. 7 to 9.

FIG. 7 shows a case in which the first slide member 1354 is at the opened position because the lock unit 1351 is opened and the second slide member 1360 is at the first position.

The rotary protrusion 1353 of the lock unit 1351 is rotated to the opened position with the key so that the first slide member 1354 is moved leftward. In this case, the drive unit 1362 places the second slide member 1360 at the first position. Therefore, the catch portions 1360a of the second slide member 1360 are released from the catch pins 1355 of the first slide member 1354 so that the door 1350 becomes openable. Consequently, when the door 1350 is opened, the inside of the note storage unit 1300 can be maintained, and notes M can be taken out.

FIG. 8 shows a case in which the first slide member 1354 is at the locked position because the lock unit 1351 is locked and the second slide member 1360 is at the first position.

The rotary protrusion 1353 of the lock unit 1351 is rotated to the locked position with the key so that the first slide member 1354 is moved rightward. In this case, the drive unit 1362 places the second slide member 1360 at the first position. Therefore, the catch portions 1360a of the second slide member 1360 are caught by the catch pins 1355 of the first slide member 1354 so that the door 1350 is locked. Since the door 1350 is locked, it is not possible to take out the notes M inside the note storage unit 1300.

FIGS. 7 and 8 illustrate opening and locking processes performed through an operation with the key when the second slide member 1360 is fixed at the first position.

FIG. 9 illustrates an operation for allowing the door 1350 to be opened even when the lock unit 1351 is locked with the key because there is not a high risk of theft when the number of notes M inside the note storage unit 1300 is smaller than a set number.

FIG. 9 shows a case in which the first slide member 1354 is at the locked position because the lock unit 1351 is locked and the second slide member 1360 is at the second position.

While the first slide member 1354 is at the locked position, the drive unit 1362 is driven to move the second slide member 1360 rightward to the second position. In this case, even when the catch pin 1355 of the first slide member 1354 is at the locked position, the catch portions 1360a of the second slide member 1360 are moved further rightward. Therefore, the catch portions 1360a are released from the catch pins 1355 so that the door 1350 becomes openable.

In this situation, even when a fault occurs in the note storage unit 1300, a worker can open the door 1350 without using the key to correct the fault in the note storage unit 1300.

When the number of notes M stored in the note storage unit 1300 is large, it is preferable not to open the door 1350 and to keep the door 1350 locked in order to prevent theft of the notes M.

Therefore, when the number of notes M is smaller than the set number, the door 1350 may be allowed to be opened as shown in FIG. 9, and when the number of notes M is the set number or more, the door 1350 may be kept locked as shown in FIG. 8.

To perform such a function, the note storage unit 1300 may include a note position sensing member (not shown) of which a position varies with a change in the number of notes M stored in the note storage unit 1300 and a position sensor (not shown) which senses the note position sensing member when the number of notes M becomes the set number.

In this exemplary embodiment the note position sensing member may be a push plate 1330 which supports the last one of the notes M stored in the note storage unit 1300. In this case, the position sensor may determine whether the notes M supported by the push plate 1330 correspond to the set number by sensing the position of the push plate 1330. When the position sensor senses the position of the push plate 1330 and determines that the number of stored notes M is the set number or more, the second slide member 1360 is controlled to be at the first position. When it is determined that the position of the push plate 1330 does not reach the set number, the second slide member 1360 is controlled to be at the second position.

A configuration for opening or closing a door 1350 in a note storage unit 1300-1 according to a second exemplary embodiment of the present invention will be described with reference to FIGS. 10 and 11.

A lock unit 1351-1 according to the second exemplary embodiment includes the same configuration as the lock unit 1351 of the first exemplary embodiment. In other words, the lock unit 1351-1 includes a locking rotary disk 1352-1 and a rotary protrusion 1353-1. When a key is operated, the locking rotary disk 1352-1 and the rotary protrusion 1353-1 are rotated together.

The note storage unit includes a first slide member 1354-1 which is placed at a locked position by the locking operation of the lock unit 1351-1 or placed at an opened position by the opening operation.

The locked position denotes that the first slide member 1354-1 is moved leftward along a left-right direction parallel to a rotation axis C in FIG. 10. The opened position denotes that first slide member 1354-1 is moved rightward along the left-right direction parallel to the rotation axis C in FIG. 10. The left and right directions for closing and opening may be changed.

The first slide member 1354-1 is formed to be elongated in the left-right direction, which is a movement direction between the locked position and the opened position. One pair of catch pins 1355-1 are provided at the both ends of the first slide member 1354-1.

At the center of the first slide member 1354-1, a catching protrusion portion 1354-1a is formed and comes into contact with the rotary protrusion 1353-1.

One pair of slots 1354-1b are formed on two side portions of the first slide member 1354-1, and one pair of guide pins 1356-1a and 1356-1b are inserted in the pair of slots 1354-1b. While the first slide member 1354-1 moves, the first slide member 1354-1 is guided by the guide pins 1356-1a and 1356-1b in the slots 1354-1b. The guide pins 1356-1a and 1356-1b are fixed to an external frame 1340.

A first spring 1357-1 is connected to the first slide member 1354-1. One end of the first spring 1357-1 is connected to a spring-fixed end 1354-1c integrally formed with the first slide member 1354-1, and the other and of the first spring 1357-1 is connected to the guide pin 1356-1a.

Since the guide pin 1356-1a is fixed to the external frame 1340, the first spring 1357-1 extends when the first slide member 1354-1 is at the opened position and is restored due to elastic restoring force when the first slide member 1354-1 is at the locked position.

FIG. 11A shows a locked state, and FIG. 11B shows an opened state. The locking operation and opening operation of the lock unit 1351-1 and the first slide member 1354-1 will be described with reference to FIG. 11.

When the key is rotated for the opening operation in the state of FIG. 11A, the rotary protrusion 1353-1 is rotated clockwise as shown in FIG. 11B, and the rotary protrusion 1353-1 pushes the catching protrusion portion 1354-1a so that the first slide member 1354-1 is moved rightward by overcoming the elastic force of the first spring 1357-1 while being guided by the guide pin 1356a-1 in the slot 1354-1b. In this case, the rotary protrusion 1353-1 is kept in contact with the catching protrusion portion 1354-1a.

When the key is rotated for the locking operation in the state of FIG. 11B, the rotary protrusion 1353-1 is rotated counterclockwise as shown in FIG. 11A, and the first slide member 1354-1 is moved rightward by the elastic restoring force of the first spring 1357-1 while being guided by the guide pin 1356-1a in the slot 1354-1b. In this case, the rotary protrusion 1353-1 is kept in contact with the catching protrusion portion 1354-1a.

The configuration of a second slide member 1360-1 will be described with reference to FIG. 12.

When the first slide member 1354-1 is at the locked position, the second slide member 1360-1 is placed at a first position in which the second slide member 1360-1 is caught by the first slide member 1354-1 so that the door 1350 is locked. Alternatively, when the first slide member 1354-1 is at the locked position, the second slide member 1360-1 is placed at a second position in which the door 1350 is unlocked.

To this end, the second slide member 1360 includes a first power transfer member 1370-1 which is moved together with a push plate 1330-1 to reciprocally move the second slide member 1360-1 between the first position and the second position, a second power transfer member 1331-1, and a control unit for controlling movement of the push plate 1330-1.

In the second slide member 1360-1, one pair of catch portions 1360-1a are formed in a hook shape at both sides so that the second slide member 1360-1 may be caught by the catch pins 1355-1 when the door 1350 is locked.

The second slide member 1360-1 may be engaged with the first power transfer member 1370-1 due to gear teeth. To this end, in an edge of the second slide member 1360-1 which is in contact with the first power transfer member 1370-1, gear teeth are formed in a length direction which is the movement direction of the second slide member 1360-1.

The first power transfer member 1370-1 may include an idle roller of which a position is fixed in a frame not shown in the drawings and rotates at the fixed position in engagement with the second slide member 1360-1. Also, the fixed position of the first power transfer member 1370-1 may be a position corresponding to a position of the second power transfer member 1370-1 when the number of notes M stored in the note storage unit 1300 is the set number.

Also, gear teeth are formed in portions of the first power transfer member 1370-1 and the second power transfer member 1331-1 coming into contact with each other so that the portions of the first power transfer member 1370-1 and the second power transfer member 1331-1 may be engaged by means of the gear teeth. Accordingly, when the second power transfer member 1331-1 makes a straight reciprocal movement, the first power transfer member 1370-1 rotates clockwise or counterclockwise at the position thereof.

The second power transfer member 1331-1 may be coupled to the push plate 1330-1 as one body. The position of the push plate 1330-1 varies with a change in the number of stored notes M. The second power transfer member 1331-1 is coupled to a belt 1380-1 for changing the position of the push plate 1330-1. When a push plate drive unit (not shown) operates, a pulley 1381-1 and the belt 1380-1 are rotated, and the second power transfer member 1331-1 and the push plate 1330-1 are moved in a straight line along the belt 1380-1. In this case, the push plate drive unit functions as the drive unit 1362.

Operation of the lock unit 1351-1, the first slide member 1354-1, the second slide member 1360-1, the first power transfer member 1331-1, and the second power transfer member 1332-2 will be described with reference to FIGS. 12 to 14.

FIG. 12 shows a case in which the first slide member 1354-1 is at the opened position because the lock unit 1351-1 is opened and the second slide member is at the first position.

The rotary protrusion 1353-1 of the lock unit 1351-1 is rotated to the opened position with the key so that the first slide member 1354-1 is moved rightward. In this case, the second slide member 1360-1 interoperates with the position of the push plate 1330-1 and thus is moved to the first position. However, even when the second slide member 1360-1 is at the second position, the door 1350 can be opened as long as the first slide member 1354-1 is at the opened position.

In this situation, the catch portions 1360-1a of the second slide member 1360-1 are released from the catch pins 1355-1 of the first slide member 1354-1 so that the door 1350 becomes openable. Consequently, when the door 1350 is opened, the inside of the note storage unit 1300 can be maintained, and notes M can be taken out.

FIG. 13 shows a case in which the first slide member 1354-1 is at the locked position because the lock unit 1351-1 is locked and the second slide member 1360-1 is at the first position.

The rotary protrusion 1353-1 of the lock unit 1351-1 is rotated to the locked position with the key so that the first slide member 1354-1 is moved leftward. In this case, when the number of stored notes M becomes the set number, the second slide member 1360-1 interoperates with the position of the push plate 1330-1 and thus is at the first position.

Also, the first power transfer member 1370-1 and the second slide member 1360-1 are engaged with each other by means of gear teeth, and the first power transfer member 1370-1 and the second power transfer member 1331-1 are engaged with each other by means of gear teeth until the number of notes M becomes the set number. In this case, the gear teeth engagement between the first power transfer member 1370-1 and the second power transfer member 1331-1 may be configured to be released when the number of notes M exceeds the set number. When the gear teeth engagement between the first power transfer member 1370-1 and the second power transfer member 1331-1 is configured to be released, the second slide member 1360-1 may be connected to a spring (not shown) so that the catch pins 1355-1 may be kept caught by the catch portions 1360-1a.

As described above, the catch portions 1360-1a of the second slide member 1360-1 are caught by the catch pins 1355-1 of the first slide member 1354-1 so that the door 1350 is locked. Since the door 1350 is locked, it is not possible to take out the notes M inside the note storage unit 1300. Consequently, when the number of notes M inside the note storage unit 1300 is larger than the set number, the first slide member 1354-1 and the second slide member 1360-1 are kept locked to prevent theft of the notes M.

Opening and locking processes performed through an operation with the key have been described above with reference to FIGS. 12 and 13.

FIG. 14 illustrates an operation for allowing the door 1350 to be opened even when the lock unit 1351-1 is locked with the key because there is not a high risk of theft when the number of notes M inside the note storage unit 1300 is smaller than a set number.

FIG. 14 shows a case in which the first slide member 1354-1 is at the locked position because the lock unit 1351-1 is locked and the second slide member 1360-1 is at the second position.

In the situation of FIG. 13, when the number of notes M inside the note storage unit 1300 is reduced to less than the set number, the belt 1380-1 is rotated by operation of the push plate drive unit as shown in FIG. 14, and the second power transfer member 1331-1 and the push plate 1330-1 are moved rightward. In this case, the first power transfer member 1370-1 rotates counterclockwise, and the second slide member 1360-1 is moved leftward.

With this movement, the catch portions 1360-1a of the second slide member 1360-1 are moved leftward from the catch pins 1355-1 of the first slide member 1354-1 even when the catch pins 1355-1 are at the locked position. Therefore, the catch portions 1360-1a are released from the catch pins 1355-1 so that the door 1350 becomes openable.

In this case, the teeth engagement between the first power transfer member 1370-1 and the second power transfer member 1331-1 may be maintained.

In this situation, even when a fault occurs in the note storage unit 1300, a worker can open the door 1350 without using the key to correct the fault in the note storage unit 1300.

When the number of notes M stored in the note storage unit 1300 is large, it is preferable not to open the door 1350 and to keep the door 1350 locked in order to prevent theft of the notes M.

Therefore, when the number of notes M is smaller than the set number, the door 1350 may be allowed to be opened as shown in FIG. 14, and when the number of notes M is the set number or more, the door 1350 may be kept locked as shown in FIG. 13.

A method of controlling the ATM according to the present invention will be described below.

The second slide member 1360 or 1360-1 may be controlled to be at the first position or the second position in the case of tallying notes M stored in a reflux cassette 200 of the ATM using the temporary storage unit 130.

Before an automatic tallying mode begins, the first slide member 1354 and the second slide member 1360 are positioned as shown in FIG. 9 in the first exemplary embodiment, and the first slide member 1354-1 and the second slide member 1360-1 are positioned as shown in FIG. 14 in the second exemplary embodiment.

First, a user inputs a signal for tallying the number of notes M stored in a reflux cassette 200.

When the tallying signal is input, notes M in any one of the plurality of reflux cassettes 200 are each individually separated, conveyed to the distinguishing unit 120 through the conveyance path 300, and distinguished by the distinguishing unit 120.

Notes passed through the distinguishing unit 120 are passed through the conveyance path 300 and stored in the temporary storage unit 130 or 1300.

With an increase in the number of notes M stored in the temporary storage unit 130 or 1300, the position of the push plate 133, 1330, or 1330-1 varies. For example, it is assumed that a set number of notes M is 300. Before the number of notes M becomes 300, the second slide member 1360 or 1360-1 is at the second position so that the door 1350 is openable.

When the number of stored notes M increases to 300 and the position sensor senses the push plate 133, 1330, or 1330-1, the control unit controls the second slide member 1360 or 1360-1 to be at the first position so that the door 1350 is locked. Therefore, it is not possible to open the door 1350 without the key.

When all the notes M of the reflux cassette 200, which is a tallying target, are stored in the temporary storage unit 130 or 1330 through such a process, the notes M of the temporary storage unit 130 or 1330 are separated again, passed through the conveyance path 300 and the distinguishing unit 120, and stored in the reflux cassette 200 which is the tallying target.

When a process in which the notes M of the temporary storage unit 130 or 1330 are stored in the reflux cassette 200 again is performed as described above, the number of notes M of the temporary storage unit 130 or 1330 is reduced. Therefore, the door 1350 is switched from the state of FIG. 8 to the state of FIG. 9 in the first exemplary embodiment and is switched from the state of FIG. 13 to the state of FIG. 14 in the second exemplary embodiment so that the door 1350 becomes openable.

In this case, the number of notes may be sensed by the distinguishing unit 120, or a sensor provided in the conveyance path 300 may sense whether notes pass through.

When the number of notes of the reflux cassette 200, which is the tallying target, is determined through the above process, the number may be displayed on a display unit (not shown) so that the user may se the number.

When tallying of the single reflux cassette 200 is completed as described above, tallying of other reflux cassettes 200 is performed through the same process.

The present invention has been described in detail above with reference to the exemplary embodiments but is not limited to the above-described embodiments. Various modifications can be made and carried out within the scope of the claims, the detailed description of the present invention, and the appended drawings and still fall within the scope of the present invention.

The invention claimed is:

1. An automated teller machine having a note storage unit comprising:
    a door including a lock unit configured to open or close a note storage space in which notes are stored
    a first slide member placed at a locked position or an opened position by a locking or opening operation of the lock unit;
    a second slide member configured to lock the door by being caught by the first slide member when the first slide member is at the locked position;
    a drive unit configured to move the second slide member between a first position for locking the door and a second position for unlocking the door when the first slide member is at the locked position; and
    a control unit configured to control running of the drive unit.

2. The automated teller machine of claim 1, wherein when a number of notes stored in the note storage space is at least a set number, the second slide member is placed at the first position to lock the door, and
    when the number of notes is smaller than the set number, the second slide member is placed at the second position to unlock the door.

3. The automated teller machine of claim 2, wherein the automated teller machine further comprises:
    a note position sensing member of which a position varies with a change in the number of notes stored in the note storage space; and a position sensor configured to sense the note position sensing member when the number of notes becomes the set number.

4. The automated teller machine of claim 1, wherein a catch pin is coupled to at least one end of the first slide member, and
 a catch portion is formed in the second slide member in a hook shape to be caught by the catch pin when the door is locked.

5. The automated teller machine of claim 4, wherein the automated teller machine comprises:
 an external frame provided on an external side of the second slide member; and
a support member coupled to the external frame and in which a cut-off portion is formed by cutting out a portion of the support member, and
 the catch portion is inserted through the cut-off portion.

6. The automated teller machine of claim 1, wherein the automated teller machine further comprises:
 a drive link configured to be rotated about a rotation axis on one side by the drive unit; and
 a drive pin integrally formed with an end of the drive link,
 a slot having a length in a direction perpendicular to a movement direction of the second slide member is formed in the second slide member, and
 the drive pin is inserted in the slot and absorbs a displacement caused when the second slide member is moved by running of the drive unit.

7. The automated teller machine of claim 1, wherein at least one slot having a length in a direction of the movement of the second slide member is formed in the second slide member, and
 at least one guide pin fixed to an external frame provided on an external side of the second slide member is inserted in the slot to guide reciprocal movement of the second slide member.

8. The automated teller machine of claim 1, wherein in the second slide member, a slot having a length in a direction of the movement of the second slide member is formed,
 a guide pin fixed to an external frame provided on an external side of the second slide member is provided, and a spring which extends as the second slide member moves toward the first position and is restored as the second slide member moves toward the second position is provided, and one end of the spring is fixed to the guide pin, and
 the other end of the spring is fixed to a spring-fixed end formed at a position which is closer to the drive unit than the guide pin.

9. The automated teller machine of claim 1, wherein the automated teller machine further comprises a power transfer member configured to change a position of the second slide member with a change in a number of notes, move the second slide member between the first position for locking the door and the second position for unlocking the door when the first slide member is at the locked position, and interoperate with a position of a push plate which supports a last one of the notes stored in the note storage space.

10. The automated teller machine of claim 9, wherein the power transfer member comprises:
 a first power transfer member engaged with the second slide member to rotate at a fixed position; and
 a second power transfer member coupled to the push plate to move with the push plate and engaged with the first power transfer member.

11. The automated teller machine of claim 10, wherein when the number of notes is smaller than a set number and the second slide member is placed at the second position, gear teeth engagement between the first power transfer member and the second power transfer member is maintained.

12. The automated teller machine of claim 10, wherein when the number of notes exceeds a set number, gear teeth engagement between the first power transfer member and the second power transfer member is released.

13. The automated teller machine of claim 12, wherein even when the gear teeth engagement between the first power transfer member and the second power transfer member is released, catching of the first slide member and the second slide member is maintained by elastic force of a spring connected to the second slide member.

* * * * *